March 17, 1953 — L. W. POPP — 2,631,728
SEPARATION OF SOLIDS FROM FLUIDS
Filed Oct. 22, 1946 — 2 SHEETS—SHEET 1

Inventor
LEE W. POPP,
By J. Piston Swecker
his Attorney

March 17, 1953 L. W. POPP 2,631,728
SEPARATION OF SOLIDS FROM FLUIDS
Filed Oct. 22, 1946 2 SHEETS—SHEET 2

Inventor
LEE W. POPP,

Patented Mar. 17, 1953

2,631,728

UNITED STATES PATENT OFFICE 2,631,728

SEPARATION OF SOLIDS FROM FLUIDS

Lee W. Popp, Reading, Pa.

Application October 22, 1946, Serial No. 704,912

1 Claim. (Cl. 210—43)

This invention relates to improvements in the separation of solids from fluids, and is applicable particularly to the separation of precipitable solids from water and gases as well as to the separation of solids from each other having different specific gravities.

It has been discovered that solids may be separated from fluid to which a circular motion is imparted which will cause a centripetal action to be imparted to the solids carried by the fluid, thus tending to separate these from each other and allowing their respective conduction to different points. A body of fluid is forced to travel in a circular motion but the precipitable solids collect near the center and thus may be carried off or removed from the fluid by a separating action period by centripetal force which is greater than the outwardly acting centrifugal force and thus may be carried off or removed from the fluid by a separating action. Where several solids of different specific gravities are present in the fluid, these may be separated from each other and may be directed into respective receptacles.

This principle is applicable, for example, to the separation of anthracite coal at a breaker, which requires a large volume of water flowing continuously. A very great saving in cost is effected by salvaging the accumulated solids from the wash water coming from the breaker.

It has been discovered that foreign substances may be removed from liquids and result in clear effluent liquids capable of re-use.

This removal of foreign substances may be accomplished by directing the liquid into a chamber where provision is made for imparting circular motion to fluid with centripetal action on the solids and forcing these inward toward the center of the circular motion, which solids then may be collected at the bottom or directed into receptacles, according to the respective specific gravities of the different solids. Provision is made for stirring the volume of fluid to create the required action therein. This results in a circular motion at the periphery of the chamber, which produces a greater pressure than at the center, with the result that the solids are forced inward due to the centripetal force acting thereon.

The fluid is carried off from the periphery of the chamber and may be re-used if desired. This fluid, where water is the carrying substance, may be re-circulated for washing, or any other purposes as desired. For that purpose additional neutral make-up water may be added if needed to compensate for the water lost from the system in the voids of the solids. Such action will eliminate the use of any acid water that may have been objectionable heretofore.

Inasmuch as the coal present in the wash water, as the latter is withdrawn from the breaker, is very fine, usually small enough to pass through a screen having one-sixteenth inch openings, such material will be conveyed readily by the water, but if larger lumps or particles be contained therein, these may be screened out before the separating action. This produces a resulting fine coal which may be sold at a profit, although the washing action in use heretofore has wasted a great deal of such coal because there was no economical means available for reclaiming it.

The principle is applicable also to other fluids than water, and may be used with air, gas or other liquids where a circular motion is produced to separate solids therefrom or to separate solids from each other. This is advantageous particularly in the drying of the solids by the forcing of these under pressure through heating elements or conduits, and imparting a circular motion to the fluid carrying such solids, in a chamber where the respective solids will be separated from each other or from the fluid. Heat may be used also to remove the moisture from the resulting solids, which is especially advantageous when the principle is applied to coal because it keeps the moisture content of the reclaimed coal at a minimum, thereby improving combustion, effecting a saving in the cost of transportation, facilitates handling particularly in cold weather, and also effects a saving of the water used especially when this is adapted for re-use.

The invention is illustrated in certain embodiments in the accompanying drawings, in which.

The invention is described primarily in connection with the separation of precipitable solids from water, although as hereinafter pointed out, it is applicable also for use in connection with other fluids and gases. When used in separating solids from water, such as the wash water of anthracite coal at a colliery, the coal may be separated from the water and also from other substances present therein such as refuse, because of the different specific gravities of the respective types of solids. The wash water at a coal breaker carries a considerable quantity of coal and refuse which must be removed from the water before the coal can be reclaimed; but if it can be salvaged, the coal can be burned and thereby used as fuel. The coal is present as very fine particles, usually small enough to pass through a one-sixteenth inch screen, but if larger particles are present in the coal these can be screened out before the separating action.

Figure 1:
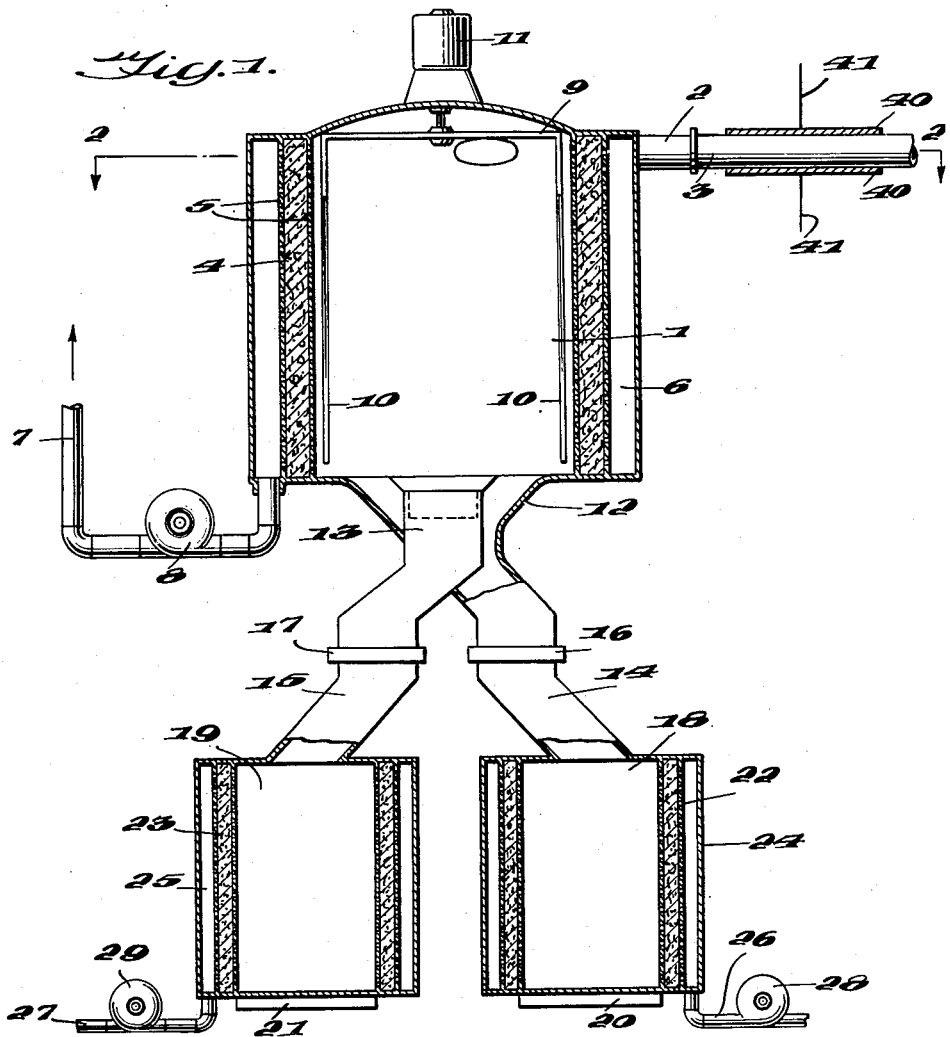
Fig. 1 is a diagrammatic view of one form of the invention with parts shown in section.
Figure 2:
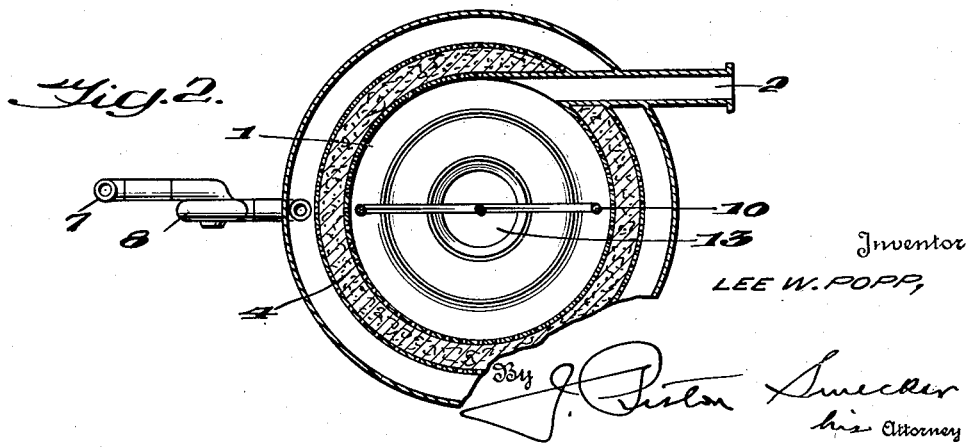
Fig. 2 is a horizontal section through the separating chamber on the line 2—2 of Fig. 1.

Referring to Fig. 1, the invention is shown in a form having a separating chamber generally designated by the numeral 1, which has a fluid inlet 2 at one side thereof, although more than one inlet may be used as desired. The inlet is shown as receiving the fluid through a conveyor pipe 3 connected therewith.

A separating chamber 1 is shown as surrounded by a filtering medium 4 which may comprise a suitable porous material, fibrous substance, spun glass fibers, such as "Fiberglas." The filtering medium 4 is confined on opposite sides by screens 5 which are shown in the form of perforated plates having relatively minute perforations therein over substantially the entire surface thereof to permit the fluid to pass through the perforations and the filtering medium from the separating chamber 1 while preventing the passage therethrough of solids carried by the fluid in its circular motion in the separating chamber.

The fluid will be under positive pressure in front of the stirring rods, and some solids may be forced against the perforated plates 5 in Fig. 1. These solids will be removed from the perforated plates by the negative pressure of displacement or vacuum action at the back of the stirring rods to subject again the solids to the action of the unequal pressures.

The filtering medium 4 is surrounded by a jacket 6 which may be connected with a discharge pipe 7 having a pump 8 for forcing the fluid through the pipe from the jacket 6.

Mounted within the separating chamber 1 is a stirring device generally indicated at 9 having depending rods 10 carried thereby and shown as disposed on opposite sides of the chamber 1 in relatively close relation to the surrounding wall of the chamber although out of contact therewith. These rods 10 preferably extend throughout the major portion of the height of the chamber and operate on the fluid contained therein. The stirring device 9 is shown as operated by a source of power such as an electric motor 11. It is preferred that the stirring device operate at a speed of approximately 60 R. P. M., although the speed thereof may be varied under different conditions and for different characters of fluids used.

At the bottom of the chamber 1 are respective hoppers 12 and 13 adapted to receive different materials. These hoppers 12 and 13 are arranged in concentric relation with respect to each other and the chamber, whereby the mouth of the hopper 12 surrounds the mouth of the hopper 13 and will receive material having a higher specific gravity than that directed into the hopper 13. Where the invention is used in the separation of solids from the wash water of coal, the coal will be directed into the hopper 13 while the refuse present in the wash water, having a higher specific gravity, will be directed into the hopper 12.

Extending downwardly from the hoppers 12 and 13 are conduits 14 and 15 respectively. Each of the conduits is shown as provided with a control valve indicated at 16 and 17, which preferably is a watertight valve capable of manual or power-closing action.

The conduits 14 and 15 are shown as extending to receptacles 18 and 19, respectively, each of which is provided with a separate chamber closed at the bottom by a valve 20 or 21 that should be fluid-tight. The chambers 18 and 19 are surrounded by filtering media 22 and 23, which in turn are surrounded by fluid jackets 24 and 25. Conduits 26 and 27 extend outwardly from the fluid jackets 24 and 25 and are shown as provided with suction pumps 28 and 29.

As the wash water from the breaker is directed through the inlet 2 to the periphery of the separating chamber 1, a circular motion is imparted to the water in the chamber substantially throughout the height of the latter by the operation of the stirring device 9. As the body of liquid is forced circumferentially around the separating chamber 1 by the action of the incoming fluid and also the rotation of the stirring device and rods 10, the water may be withdrawn through the filtering medium 4 into the fluid jacket 6. At the same time, due to the greater pressure at the periphery of the chamber than at the center thereof, a centripetal force is created acting on the solids tending to direct the latter inwardly of the body of liquid toward the center of the chamber.

The spiral paths of the solids will vary according to their specific gravity. Therefore the coal will be directed to the center of the chamber and into the hopper 13 while the slate and other refuse having a higher specific gravity will be directed into the hopper 12. Therefore the solids will be separated from each other as coal from non-combustible refuse of different specific gravity, while being separated at the same time from the water where it would form a contaminating substance.

The water that is directed through the filtering medium 4 is collected in the fluid chamber 6 and drawn off by the pump 8 through the conduit 7. This water then may be returned to the system and used for washing more coal.

The separated coal that is discharged into the hopper 13 passes down through the conduit 15 and the open valve 17 into the chamber 19, where it will collect to fill the chamber. During this filling action the pump 29 is operated to draw outward the moisture present in the coal so as to reduce its moisture content.

In like manner, the refuse collected in the chamber 18 has the moisture removed therefrom by the pump 28, which moisture may be re-used in the washing system.

As soon as either of the chambers 18 or 19 is filled, the corresponding valve 16 or 17 is closed and the solids of either coal or refuse are subjected to the effect of comparatively high vacuum to lower the moisture content which may or may not include heating, preparatory to opening the valves 20 or 21 to discharge the contents from the chamber to a suitable point or conveyor.

Figure 3:
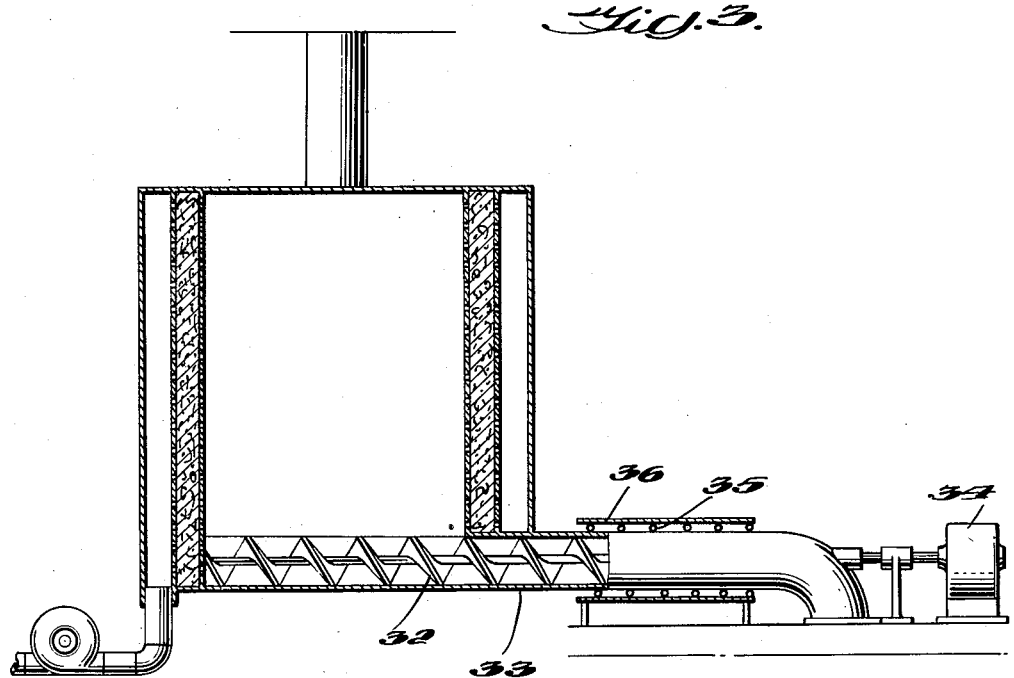
Fig. 3 is a diagrammatic view with parts shown in section, of a modified form of unit.

Either of these receptacles may be provided with a discharge conveyor such as is shown at 32 in Fig. 3, the form illustrated being a spiral conveyor passing through a conveyor tube 33 and operated by a motor 34. Provision may be made for heating the material as it is discharged through the conveyor tube by a heating coil 35 surrounding the tube and enclosed within insulating material 36. This may be an electric coil for high frequency heating or a steam coil or other means applied thereto for heating effect. Such heating action will be effective to lower the moisture content of the material discharged from the receptacle.

The system may be used in a very similar manner with other fluids than water, and will function in substantially the same way as described, particularly when it is desired to separate solids from each other having different specific gravities. Such solids will be carried by air or gas through the inlet tube 3 and inlet 2 into the separating chamber 1 where a separating action is provided substantially as described, the air or gas being passed outward through the filtering medium 4 while the separated solids are discharged at the bottom in the hoppers 12 and 13.

As the air-carried solids are passed through the inlet tube 3, provision may be made if desired for heating and drying these solids to reduce the moisture contents thereof and thereby also facilitate separation. One form of heating means, as illustrated in Fig. 1, involves the use of dielectric heating by electrodes shown at 40 connected with a source of high frequency current generally as indicated at 41. Where the electrodes are placed directly against the conduit 3, the latter should be of non-conducting material, such as rubber, canvas, or the like.

While the invention is illustrated and described in certain embodiments, it is recognized that variations and changes may be made therein without departing from the invention, except as specified in the claim.

I claim:

An apparatus for separating solids suspended in a fluid, comprising a main chamber, said chamber having inner and outer walls defining inner and outer chambers, the inner wall of said chamber having perforations therein, agitating means in close proximity to the periphery of said inner perforated chamber wall, the outer wall of said chamber being impervious, a filter interposed between said inner and said outer chamber walls, a tangential fluid inlet leading to said inner chamber, the outer chamber having a fluid outlet disposed betwen said filter and said outer chamber wall, and a plurality of solid collecting openings in the floor of said inner chamber.

LEE W. POPP.

REFERENCES CITED

The following references are of record in the file of this patent:

UNITED STATES PATENTS

| Number | Name | Date |
| --- | --- | --- |
| 315,398 | Eyre | Apr. 7, 1885 |
| 336,425 | Ockershausen | Feb. 16, 1886 |
| 660,214 | Gathmann | Oct. 23, 1900 |
| 858,154 | Conversy | June 25, 1907 |
| 1,301,544 | Crombie | Apr. 22, 1919 |
| 1,494,704 | Petree | May 20, 1924 |
| 1,591,821 | Heaton | July 6, 1926 |
| 1,664,769 | Chance | Apr. 3, 1928 |
| 1,675,199 | Smith | June 26, 1928 |
| 1,880,185 | Kerns et al. | Sept. 27, 1932 |
| 1,973,607 | Bunn | Sept. 11, 1934 |
| 2,273,271 | Kerns | Feb. 17, 1942 |
| 2,351,492 | Cowles | June 13, 1944 |
| 2,375,826 | Scott | May 15, 1945 |
| 2,430,135 | Neumann | Nov. 4, 1947 |
| 2,518,084 | Smith | Aug. 8, 1950 |

FOREIGN PATENTS

| Number | Country | Date |
| --- | --- | --- |
| 890 | Great Britain | of 1874 |
| 5,648 | Great Britain | of 1912 |
| 305,844 | Germany | May 25, 1918 |

OTHER REFERENCES

Elements of Physics, by Smith, 5th edition, 1948, pp. 170–173.

Text-Book of Physics, by Spinney, 1920, pp. 51–53.

Ganot's Physics, 1890, translation by Atkinson, pp. 38 and 39.